United States Patent
Grobman et al.

(10) Patent No.: US 7,904,903 B2
(45) Date of Patent: Mar. 8, 2011

(54) SELECTIVE REGISTER SAVE AND RESTORE UPON CONTEXT SWITCH USING TRAP

(75) Inventors: Steven L. Grobman, El Dorado Hills, CA (US); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1521 days.

(21) Appl. No.: 11/174,254

(22) Filed: Jun. 30, 2005

(65) Prior Publication Data

US 2007/0006228 A1 Jan. 4, 2007

(51) Int. Cl.
*G06F 9/455* (2006.01)
*G06F 9/46* (2006.01)

(52) U.S. Cl. ............................. 718/1; 718/108
(58) Field of Classification Search .............. 718/1, 102, 718/108; 712/224, 228
See application file for complete search history.

(56) References Cited

U.S. PATENT DOCUMENTS

| | | | | |
|---|---|---|---|---|
| 4,787,031 | A * | 11/1988 | Karger et al. ................ | 718/100 |
| 7,275,246 | B1 * | 9/2007 | Yates et al. .................... | 718/100 |
| 7,412,702 | B1 * | 8/2008 | Nelson et al. ................... | 718/1 |
| 7,478,388 | B1 * | 1/2009 | Chen et al. ..................... | 718/1 |
| 7,484,208 | B1 * | 1/2009 | Nelson ........................... | 718/1 |
| 2003/0037089 | A1 * | 2/2003 | Cota-Robles et al. .......... | 709/1 |
| 2003/0217250 | A1 * | 11/2003 | Bennett et al. ................. | 712/224 |
| 2004/0123288 | A1 * | 6/2004 | Bennett et al. ................. | 718/1 |
| 2004/0268347 | A1 * | 12/2004 | Knauerhase et al. ........... | 718/1 |
| 2005/0081199 | A1 * | 4/2005 | Traut ............................. | 718/1 |
| 2006/0005199 | A1 * | 1/2006 | Galal et al. .................... | 718/108 |
| 2006/0070065 | A1 * | 3/2006 | Zimmer et al. ................. | 718/1 |
| 2006/0149940 | A1 * | 7/2006 | Mukherjee ..................... | 712/228 |

FOREIGN PATENT DOCUMENTS

| | | |
|---|---|---|
| JP | 62-221736 A | 9/1987 |
| JP | 03-073027 A | 3/1991 |
| JP | 05-006281 A | 1/1993 |
| WO | 2004/061659 A2 | 7/2004 |
| WO | 2007/005819 A1 | 1/2007 |

OTHER PUBLICATIONS

Tokuzo Kiyohara et al., "Register Connection: A New Approach to Adding Registers Into Instruction Set Architectures" Proceedings of the Annual International Symposium on Computer Architecture. San Diego, May 16-19, 1993, Los Alamitos, IEEE. Comp. Soc. Press, U.S. vol. Symp. 20. May 16, 1993, pp. 247-256.

Stephen A. Edwards, "An Esterel Compiler for Large Control-Dominated Systems" IEEE Transactions on Computer Aided Design of Integrated Circuits and Systems, IEEE Service Center, Piscataway, NJ, US. vol. 21, No. 2, Feb. 2002, pp. 169-183.

(Continued)

*Primary Examiner* — Li B Zhen
*Assistant Examiner* — Brian Chew
(74) *Attorney, Agent, or Firm* — Joni D. Stutman

(57) ABSTRACT

In some embodiments, the invention involves saving limited context information when transitioning between virtual machines. A predetermined set of instructions and events cause a trap. A bit or flag is set to indicate that the event has occurred within a virtual machine. The virtual machine monitor determines whether specific register sets must be saved or restored upon a context switch, based on whether the flag has been set. Other embodiments are described and claimed.

25 Claims, 3 Drawing Sheets

OTHER PUBLICATIONS

D. J. Quammen et al., "Register Window Management for a Real-Time Multitasking RISC" System Sciences, 1989, vol. I: Architecture Track, Proceedings of the Twenty-Second Annual Hawaii International Conference, Jan. 3-6, 1989, Washington, DC., IEEE Comput. Soc., pp. 135-142.

Intel Corporation, "Intel® Virtualization Technology Specification for the IA-32 Intel® Architecture," Document No. C97063-002, Apr. 2005, pp. 2-1 to 2-24, 5-1 to 5-22.

Uhlig, Rich et al., "VT-x Architecture Overview," Intel Developer Forum, San Francisco, CA, Mar. 1-3, 2005, 62 pages.

International Search Report and Written Opinion received for PCT Patent Application No. PCT/US2006/025960, mailed on Nov. 10, 2006, 12 pages.

International Preliminary Report on Patentability received for PCT Patent Application No. PCT/US2006/025960, mailed on Jan. 17, 2008, 8 pages.

Office Action received for Korean Patent Application No. 2007-7030428, mailed on Oct. 1, 2009, 2 pages of English translation.

Office Action received for Japanese Patent Application No. 2008-519684, mailed on Aug. 10, 2010, 29 pages of Japanese Office Action, including 15 pages of English translation.

Office Action received for European Patent Application No. 06786212.8, mailed on Apr. 11, 2008, 6 pages.

Office Action received for Chinese Patent Application No. 2006800240723, mailed on Apr. 10, 2009, 14 pages of Chinese Office Action, including 8 pages of English translation.

* cited by examiner

US 7,904,903 B2

SELECTIVE REGISTER SAVE AND RESTORE UPON CONTEXT SWITCH USING TRAP

FIELD OF THE INVENTION

An embodiment of the present invention relates generally to computing devices and, more specifically, to saving limited context information when transitioning between virtual machines.

BACKGROUND INFORMATION

Various mechanisms exist for context switching between processes controlled by an operating system. Similarly, in virtualization environments, context switching is necessary when the virtual machine (VM) scheduler, typically a virtual machine monitor/manager (VMM) switches between active and inactive virtual machines. In a virtualization environment, the VMM schedules the available processor cycles among running operating systems. The various operating systems (OSs) run in corresponding guest virtual machines. Before scheduling a guest VM to run, the context of the currently running VM must be saved to ensure that it will run properly when it is scheduled to run again.

Various processor registers must be saved as part of the context switch. Standard registers, stack pointers, MMX, single instruction multiple data (SIMD) and floating point (FP) registers must be saved, in addition to any processor-specific registers. When context is switched from the currently running VM, a context save is performed before the next scheduled VM is scheduled. Context registers for the next scheduled VM are restored prior to allowing the VM to run again. Context switching can be expensive in terms of time, power and other resources.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to limiting the context to be saved when switching among virtual machines (VMs) in a virtualization environment. In at least one embodiment, the present invention is intended to save only the register sets that are actually being used by the currently running VM, instead of saving all possible registers.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Existing systems will typically save all context for a VM before suspending it and scheduling another VM. In many cases, the suspended VM has not used all classes of registers. For instance, the VM may not perform floating point operations, so it would not need the context for the floating point (FP) registers when it is resumed by the VMM. Existing systems will save the FP registers anyway, prior to context switching. This operation is wasteful, when not necessary.

Figure 1:
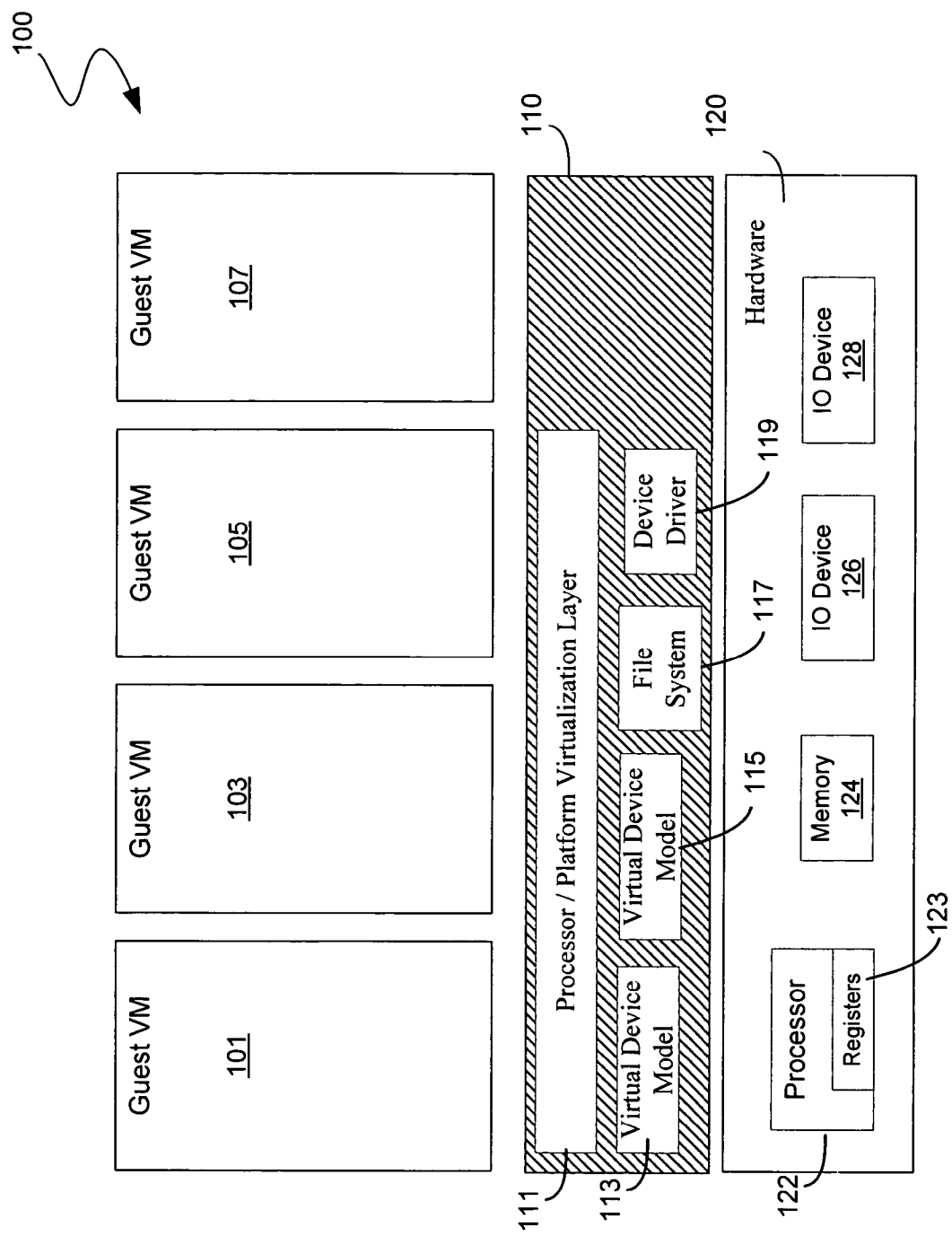
FIG. 1 is a block diagram of an exemplary virtualization platform on which may be practiced embodiments of the present invention.

Referring now to FIG. 1, there is shown an exemplary virtualization platform 100 on which may be practiced embodiments of the present invention. The VMM 110 and guest VMs 101, 103, 105 and 107 execute on platform hardware 120. The platform hardware 120 may include a processor 122, memory 124 and one or more I/O devices 126 and 128. Processor 122 may be any type of processor capable of executing software, such as a microprocessor, digital signal processor, microcontroller, or the like. The platform hardware 120 may be of a personal computer (PC), mainframe, handheld device, portable computer, set top box, or any other computing system. Though FIG. 1 shows only one such processor 122, there may be one or more processors in platform hardware 120 and one or more of the processors may include multiple threads, multiple cores or the like.

Memory 124 may be a hard disk, a floppy disk, random access memory (RAM), read only memory (ROM), flash memory, or any other type of medium readable by processor 122. Memory 124 may store instructions for performing the execution of method embodiments of the present invention.

The one or more I/O devices 126 and 128 may be, for example, network interface cards, communication ports, video controllers, disk controllers on system buses (e.g., PCI, ISA, AGP), devices integrated into the chipset logic or processor (e.g., real-time clocks, programmable timers, performance counters) or any other device on the platform hardware 120. The one or more I/O devices 126 and 128 may be accessed through I/O instructions, or memory mapped I/O accesses or through any other means known in the art.

The processor 122 has a variety of registers 123. The context of registers 123 are typically saved during processor context switching.

In embodiments of the present invention, the VMM is notified when a guest VM uses a set of registers to indicate that the VMM needs to save the context of the used registers during a context switch. In an example, streaming SIMD extension (SSE) registers may be used by a guest VM. Certain instructions utilize a register set. For instance there exists a known instruction to perform a SIMD multiply. If a guest VM process executes this instruction, then the SIMD registers are used in this guest VM.

In existing virtualization environments a virtualization trap may occur in some circumstances. This trap causes an exit to the VMM from processing on a guest VM. In some environments, this trap is called a VM_exit. Embodiments of the invention cause a trap, or VM_exit, to occur when predetermined instructions are executed in a guest VM. Control transfers to the VMM, which makes a note of this usage. In an embodiment, the VMM clears the trap mechanism, so that subsequent usage of the predetermined instruction does not cause additional traps during the current session. Thus, only the first usage of the predetermined instruction will cause a trap.

Figure 2:
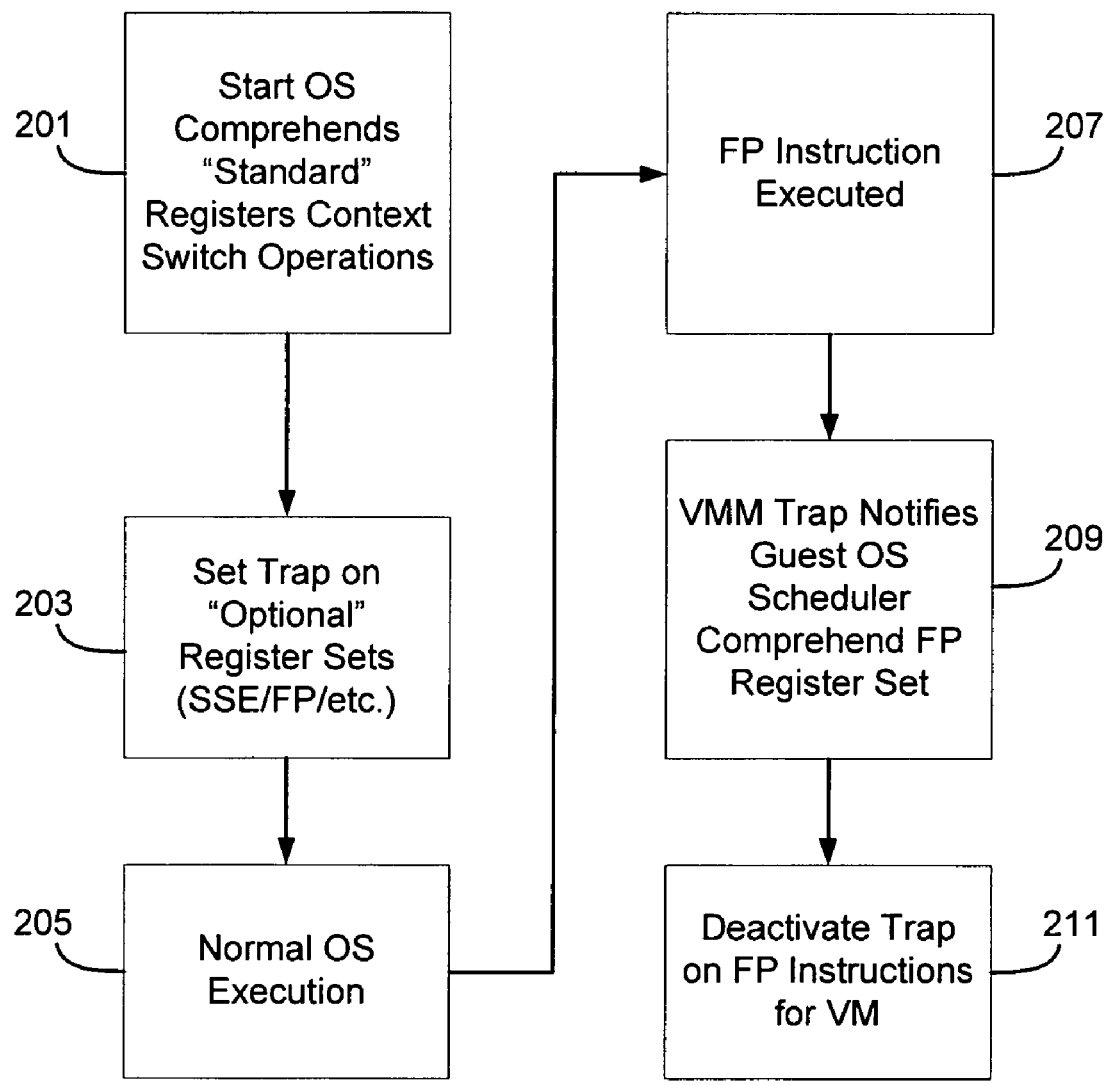
FIG. 2 is a flow diagram of an exemplary process flow according to embodiments of the present invention.

Referring now to FIG. 2, there is shown an exemplary process flow according to embodiments of the present invention. Standard registers are comprehended during context switches in 201. In other words, a standard set of registers may always be saved with the guest VM context. The VMM sets a predetermined set of operations or instructions to cause a trap in order to notify the VMM that corresponding registers are being used, in 203. It will be apparent to one of ordinary skill in the art that a variety of methods may be used to identify which instructions should cause traps.

In some embodiments running in virtualization environments, a virtual machine control structure (VMCS) may be used to identify these target operations. A VMCS is a data structure allocated to each VM for each processor that is assigned to the specific VM. In multi-processor systems, the VMM may choose to assign a processor to specific VM and not assign it to other VMs. In other embodiments, the VMM may allow all VMs to use all processors. The VMCS contains a number of control fields to define which events cause a VM_exit (trap) and which events do not cause a trap. VMCS data structures in existing systems do not accommodate fields for trapping instructions.

VMCS data structures in existing systems do not accommodate fields for a trapping mechanism for groups of instructions that access specific register sets. Setting up the VMCS to accommodate traps for events as described herein may be implemented by allocating additional bit fields to the VMCS. The additional bit fields will identify FP, MMX, SSE, SIMD instructions, and the like, to determine whether a process in a guest VM has used a specific register set.

The VMCS may be dynamically modifiable. As a guest VM is scheduled to run, the VMCS fields may be set as desired so that target instructions and events may be identified. For instance, the VMCS may have a bit corresponding to the set of instructions that utilize the floating point registers. In this scenario, setting this bit and then execution of an FDIV instruction in the corresponding VM would cause a VM_exit, or hypervisor trap. Once the traps are identified and set, normal OS operation proceeds in 205.

In an example execution, an FP instruction, like FDIV, may be executed, as in 207. Control is transferred to the VMM to take appropriate action based on the operation causing the trap in 209. In this case, the usage of FDIV is associated with the guest VM that executed the instruction to indicate that FP register context must be saved for this VM. Once the VMM has identified that the guest VM has a need for the FP register context to be saved, the trap is deactivated in 211 so that each subsequent FP instruction will not cause a trap in the current session.

In some embodiments, the trap may remain deactivated until the guest VM exits, or is shutdown. Thus, each context switch to/from this guest VM will require (in this example) the FP registers to be saved or restored. However, some guest VMs may only occasionally use a set of registers. In this case, it may be more efficient to reset the trap at each context switch. In some embodiments, the trap is reactivated when a guest VM is launched or resumed. The VMM will then also "forget" that the guest VM used the register set in previous sessions. If the guest VM does not use a specific register set during this active session, then the VMM will not have identified the register set as requiring a context save. Thus, context saving/resuming may be minimized.

In an embodiment, target events may be identified in the VMCS. However, when the event occurs, a bit may be set or cleared in the VMCS to indicate that this event has occurred without requiring a full trap of VM_exit. This bit may then be checked at the onset of context switching to determine whether a register set must be saved/restored. The processor hardware may be configured to automatically set this bit upon the occurrence of the event. This will typically require the instruction set architecture to be configured to trap on specific instructions. Other embodiments may set the bit in software, firmware or a combination of a hardware, firmware and software. Some embodiments of the present invention may be implemented by further extending the VT-x (virtualization technology extension) architecture. More information about VT-x may be found in "Intel® Virtualization Technology Specification for the IA-32 Intel® Architecture", and may be found on the public Internet at URL cache-www*intel*com/cd/00/00/19/76/197666__197666.pdf. (Note that periods have been replaced with asterisks in URLs contained within this document in order to avoid inadvertent hyperlinks).

In another embodiment, the VMM is aware of whether more than one guest VM uses a specific register set. For instance, there may be five guest VMs operating in the virtualization environment, but only one is using FP operations. In this case, only one guest VM accesses the FP registers, so the FP register context need not be saved or restored. In addition to keeping track of whether a specific guest VM uses the register set, the VMM may also keep track of whether the register set is at risk of being modified by a second guest VM, and if not, does not save/restore the register set during a context switch. When a second guest OS accesses the register set, then the VMM will save/restore that register set upon a context switch for the two guest VMs which use the register set.

In another embodiment, an operating system running in a guest VM cooperates with the VMM. The guest OS may be knowledgeable of its processes to know which processes use which register sets. For instance, if the OS knows that only one executing process uses SIMD instructions, when that process exits, SIMD registers no longer need to be saved/restored upon a context switch of this guest VM. In this embodiment, the OS may notify the VMM when a process exits that has previously caused a trap, and the VMM may then reset the trap control structure to indicate that the guest VM does not use the specific register set.

Figure 3:
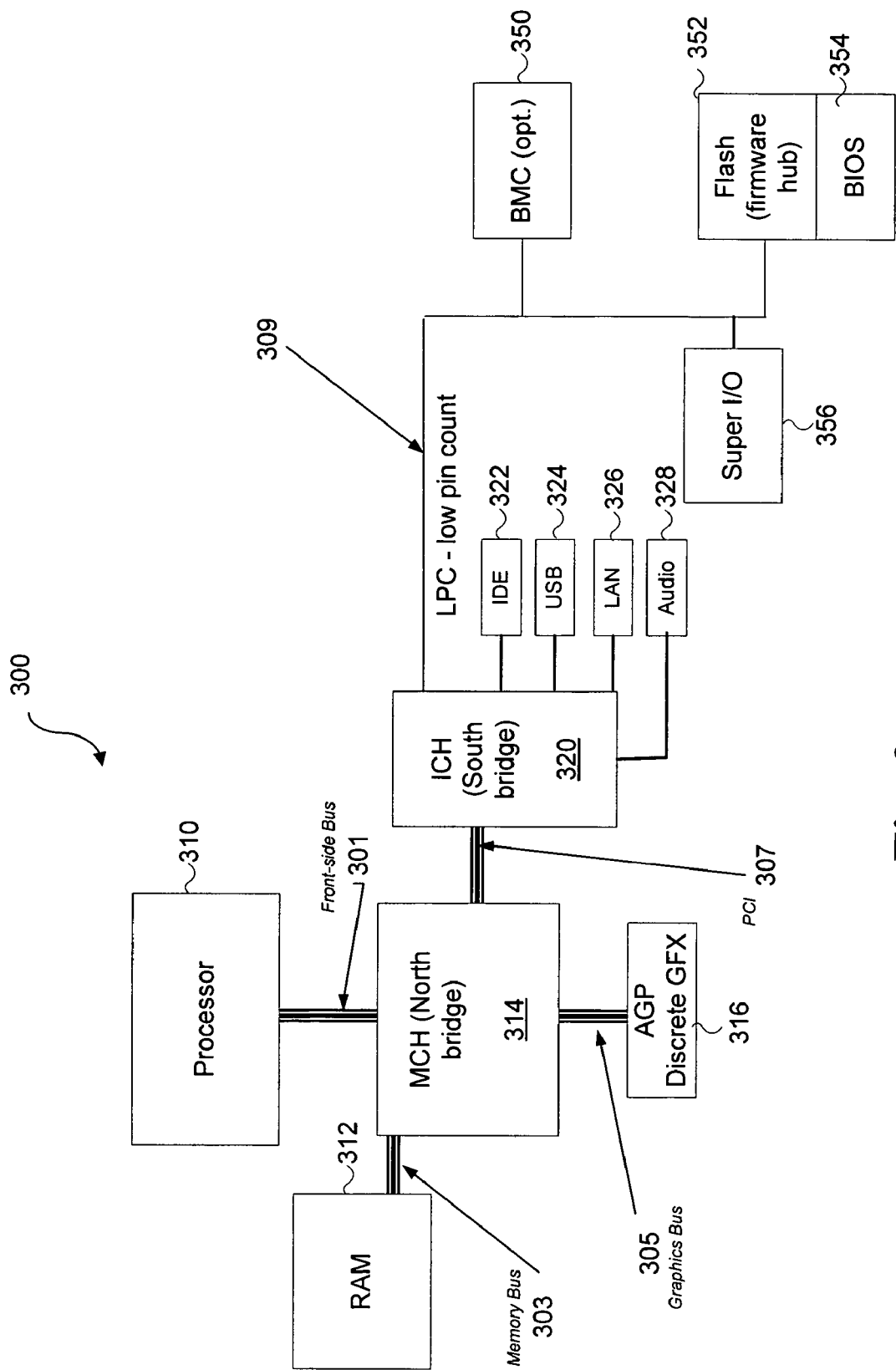
FIG. 3 is a block diagram of an exemplary platform on which a virtual machine monitor (VMM) may be executed, according to embodiments of the invention.

Referring now to FIG. 3, there is shown an exemplary platform 300 on which the previously described VMM may be executed, according to embodiments of the invention. Processor 310 communicates with a memory controller hub (MCH) 314, also known as North bridge, via the front side bus 301. The MCH 314 communicates with system memory 312 via a memory bus 303. The MCH 314 may also communicate with an advanced graphics port (AGP) 316 via a graphics bus 305. The MCH 314 communicates with an I/O controller hub (ICH) 320, also known as South bridge, via a peripheral component interconnect (PCI) bus 307. The ICH 320 may be coupled to one or more components such as PCI hard drives (not shown), legacy components such as IDE 322, USB 324, LAN 326 and Audio 328, and a Super I/O (SIO) controller 356 via a low pin count (LPC) bus 356.

Processor 310 may be any type of processor capable of executing software, such as a microprocessor, digital signal processor, microcontroller, or the like. Though FIG. 1 shows only one such processor 310, there may be one or more processors in platform hardware 300 and one or more of the processors may include multiple threads, multiple cores, or the like.

Memory 312 may be a hard disk, a floppy disk, random access memory (RAM), read only memory (ROM), flash memory, or any other type of medium readable by processor 310. Memory 312 may store instructions for performing the execution of method embodiments of the present invention.

Non-volatile memory, such as Flash memory 352, may be coupled to the IO controller via a low pin count (LPC) bus 309. The BIOS firmware 354 typically resides in the Flash memory 352 and boot up will execute instructions from the Flash, or firmware.

In some embodiments, platform 300 is a server enabling server management tasks. This platform embodiment may have a baseboard management controller (BMC) 350 coupled to the ICH 320 via the LPC 309.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A virtualization platform comprising:
   a processor having a plurality of register sets;
   a plurality of virtual machines (VM) to run on the processor, each VM to run in a guest operating system, each VM associated with at least one virtual machine control structure (VMCS), the VMCS having fields indicating trap events for processor instructions accessing selected register sets;
   a trap mechanism corresponding to each VM to exit from a running VM responsive to occurrence of a predetermined trap event in the VM, the trap mechanism to set a field in the VM's VMCS indicating that the predetermined trap event has occurred in the VM; and
   a virtual machine monitor (VMM) to schedule and switch context among the plurality of virtual machines, wherein the VMM is to determine which of the plurality of register sets are to be saved and restored upon context switching among the plurality of VMs, the determination being based at least in part on the trap event fields in the VM's VMCS.

2. The virtualization platform as recited in claim 1, wherein the trap event field in the VMCS is reset in response to a predetermined event.

3. The virtualization platform as recited in claim 1, wherein the trap mechanism is to be disabled for a selected event in a virtual machine in response to the selected event previously occurring in the virtual machine.

4. The virtualization platform as recited in claim 3, wherein a deactivated trap mechanism is to be reactivated for a virtual machine, when the virtual machine is resumed.

5. The virtualization platform as recited in claim 1, wherein the VMM is to save and restore context for a selected register set upon a context switch when more than one of the plurality of virtual machines have a corresponding trap event field in their VMCSs set by the trap mechanism for the selected register set, and wherein the VMM is to refrain from saving and restoring context for a selected register set upon a context switch when one or fewer of the plurality of virtual machines have a corresponding trap event field in their VMCSs set by the trap mechanism for the selected register set.

6. The virtualization platform as recited in claim 1, wherein an operating system (OS) running in one of the plurality of virtual machines notifies the VMM when a selected register set is no longer being accessed by processes running under the OS.

7. A method comprising:
   identifying when a first virtual machine running in a virtualization platform uses a selected one of a plurality of register sets within a processor on the virtualization platform, wherein the identifying further comprises trapping an event in a first virtual machine, wherein the event indicates usage of the selected register set, and setting a flag to indicate that the selected register set is used by the first virtual machine;

determining whether the flag is set for a corresponding selected register set;

saving context of the selected register set for the first virtual machine when the selected register set is identified as being used by the first virtual machine, by a virtual machine monitor (VMM), the saving to occur prior to switching processor context from the first virtual machine to a second virtual machine; and restoring context of the selected register set for the first virtual machine when the register set is identified as being used by the first virtual machine, by a virtual machine monitor (VMM), the restoring to occur prior to switching processor context to the first virtual machine from a second virtual machine.

8. The method as recited in claim 7, further comprising:
refraining from trapping the event when the selected event has previously been identified as being used by the first virtual machine.

9. The method as recited in claim 7, further comprising:
determining whether a first virtual machine uses a selected register set;
determining whether any other virtual machine uses the selected register set; and
refraining from the saving context of the selected register set for the first virtual machine when the selected register set is not used by any other virtual machine.

10. The method as recited in claim 7, further comprising:
notifying the VMM that the first VM no longer uses the selected register set.

11. A method comprising:
identifying when a first virtual machine running in a virtualization platform uses a selected one of a plurality of register sets within a processor on the virtualization platform,
wherein the identifying further comprises trapping an event in a first virtual machine, wherein the event indicates usage of the selected register set, and setting a flag to indicate that the selected register set is used by the first virtual machine, wherein the trapping further comprises identifying whether the event in a first virtual machine is to be trapped based on data in a control structure, the data corresponding to the event, trapping the event in a first virtual machine when the control structure indicates that the event should be trapped and refraining from trapping the event when the control structure indicates that the event should not be trapped;
determining whether the flag is set for a corresponding selected register set; and
saving context of the selected register set for the first virtual machine when the selected register set is identified as being used by the first virtual machine, by a virtual machine monitor (VMM), the saving to occur prior to switching processor context from the first virtual machine to a second virtual machine.

12. The method as recited in claim 11, further comprising:
determining whether a first virtual machine uses a selected register set;
determining whether any other virtual machine uses the selected register set; and
refraining from the saving context of the selected register set for the first virtual machine when the selected register set is not used by any other virtual machine.

13. The method as recited in claim 11, further comprising:
notifying the VMM that the first VM no longer uses the selected register set.

14. The method as recited in claim 11, wherein the control structure comprises a virtual machine control structure (VMCS).

15. A machine readable storage medium having instructions stored thereon, the instructions when executed on a machine, cause the machine to:
identify when a first virtual machine running in a virtualization platform uses a selected one of a plurality of register sets within a processor on the virtualization platform, wherein the identifying further comprises instructions to trap an event in a first virtual machine, wherein the event indicates usage of the selected register set, and instructions to set a flag to indicate that the selected register set is used by the first virtual machine;
determine whether the flag is set for a corresponding selected register set; save context of the selected register set for the first virtual machine when the register set is identified as being used by the first virtual machine, by a virtual machine monitor (VMM), the saving to occur prior to switching processor context from the first virtual machine to a second virtual machine; and
restore context of the selected register set for the first virtual machine when the register set is identified as being used by the first virtual machine, by a virtual machine monitor (VMM), the restoring to occur prior to switching processor context to the first virtual machine from a second virtual machine.

16. The medium as recited in claim 15, further comprising instructions to:
refrain from trapping the event when the selected event has previously been identified as being used by the first virtual machine.

17. The medium as recited in claim 15, further comprising instructions to:
determine whether a first virtual machine uses a selected register set;
determine whether any other virtual machine uses the selected register set; and
refrain from the saving context of the selected register set for the first virtual machine when the selected register set is not used by any other virtual machine.

18. The medium as recited in claim 15, further comprising instructions to:
notify the VMM that the first VM no longer uses the selected register set.

19. A machine readable storage medium having instructions stored thereon, the instructions when executed on a machine, cause the machine to:
identify when a first virtual machine running in a virtualization platform uses a selected one of a plurality of register sets within a processor on the virtualization platform,
wherein the identifying further comprises instructions to trap an event in a first virtual machine, wherein the event indicates usage of the selected register set, and set a flag to indicate that the selected register set is used by the first virtual machine, wherein the trapping further comprises instructions to identify whether the event in a first virtual machine is to be trapped based on data in a control structure, the data corresponding to the event, trap the event in a first virtual machine when the control structure indicates that the event should be trapped and refrain from trapping the event when the control structure indicates that the event should not be trapped;
determine whether the flag is set for a corresponding selected register set; and save context of the selected register set for the first virtual machine when the selected register set is identified as being used by the first virtual machine, by a virtual machine monitor (VMM), the saving to occur prior to switching processor context from the first virtual machine to a second virtual machine.

20. The medium as recited in claim 19, further comprising instructions to:
   determine whether a first virtual machine uses a selected register set;
   determine whether any other virtual machine uses the selected register set; and
   refrain from the saving context of the selected register set for the first virtual machine when the selected register set is not used by any other virtual machine.

21. The medium as recited in claim 19, further comprising instructions to:
   notify the VMM that the first VM no longer uses the selected register set.

22. The medium as recited in claim 19, wherein the control structure comprises a virtual machine control structure (VMCS).

23. A method comprising:
   responsive to execution of an instruction in a first virtual machine running on a processor, the instruction corresponding to a selected register set, causing a trap from the executing first virtual machine to a virtual machine monitor;
   setting a flag, in response to the execution of the instruction, corresponding to the selected register set, the flag indicating that the first virtual machine uses the selected register set;
   disabling the trapping of the first virtual machine for the selected register set after setting the flag, wherein the flag comprises at least one bit in a control structure corresponding to the first virtual machine; and
   responsive to a request for a processor context switch between the first virtual machine and a second virtual machine, determining whether the selected register set needs to be saved or restored based in part on the flag corresponding to the register set and performing the context switch by a virtual machine monitor based on the flag value.

24. The method as recited in claim 23, further comprising:
   responsive to a request for a processor context switch from the first virtual machine to the second virtual machines, saving context of the selected register set when the corresponding flag is set.

25. The method as recited in claim 23, further comprising:
   responsive to a request for a processor context switch from the second virtual machine to the first virtual machines, restoring context of the selected register set when the corresponding flag is set.

* * * * *